US 007747648B1

(12) United States Patent
Kraft et al.

(10) Patent No.: US 7,747,648 B1
(45) Date of Patent: Jun. 29, 2010

(54) WORLD MODELING USING A RELATIONSHIP NETWORK WITH COMMUNICATION CHANNELS TO ENTITIES

(75) Inventors: Reiner Kraft, Gilroy, CA (US); Farzin Maghoul, Hayward, CA (US); Kenneth G. Perluss, Gilroy, CA (US)

(73) Assignee: Yahoo! Inc., Sunnyvale, CA (US)

( * ) Notice: Subject to any disclaimer, the term of this patent is extended or adjusted under 35 U.S.C. 154(b) by 277 days.

(21) Appl. No.: 11/058,477

(22) Filed: Feb. 14, 2005

(51) Int. Cl.
*G06F 7/00* (2006.01)
*G06F 17/30* (2006.01)
(52) U.S. Cl. .................. 707/790; 707/794; 707/827; 709/219
(58) Field of Classification Search .................. 707/2, 707/3, 103 R, 104.1
See application file for complete search history.

(56) References Cited

U.S. PATENT DOCUMENTS

| 5,721,910 | A  | * | 2/1998  | Unger et al. ............. 707/100 |
| 6,038,566 | A  | * | 3/2000  | Tsai .......................... 707/102 |
| 6,493,721 | B1 | * | 12/2002 | Getchius et al. ......... 707/104.1 |
| 6,641,037 | B2 | * | 11/2003 | Williams ................. 235/383 |
| 6,654,768 | B2 | * | 11/2003 | Celik ....................... 707/104.1 |
| 6,748,422 | B2 | * | 6/2004  | Morin et al. ............. 709/206 |
| 2002/0169658 | A1 | * | 11/2002 | Adler ....................... 705/10 |
| 2004/0083428 | A1 | * | 4/2004  | Slade ....................... 715/513 |
| 2004/0103030 | A1 | * | 5/2004  | Evans et al. ............. 705/14 |
| 2005/0131909 | A1 | * | 6/2005  | Cavagnaro et al. ...... 707/10 |
| 2006/0004914 | A1 | * | 1/2006  | Kelly et al. ............... 709/219 |
| 2006/0149712 | A1 | * | 7/2006  | Kindsvogel et al. ..... 707/3 |

OTHER PUBLICATIONS

Poremsky, D. Google and Other Search Engines: Visual Quickstart Guide [online]. Peachpit Press, 2004 [retrieved on Apr. 26, 2007]. Retrieved from the Internet:< URL: http://proquest.safaribooksonline.com/0321246144 > Chapter 18 and Chapter 19, section: "Citysearch."*
Ullman, L. PHP for the World Wide Web: Visual QuickStart Guide [online]. Peachpit Press, 2001 [retrieved on Apr. 27, 2007]. Retrieved from the Internet:< URL: http://proquest.safaribooksonline.com/0201727870 > Chapter 6, section "The Switch Conditional."*

* cited by examiner

*Primary Examiner*—Mohammad Ali
*Assistant Examiner*—Angelica Ruiz
(74) *Attorney, Agent, or Firm*—Seth H. Ostrow, Esq.; Ostrow Kaufman & Frankl LLP

(57) ABSTRACT

Systems and methods for information retrieval and communication employ a world model. The world model is made up of interrelated entity models, each of which corresponds to an entity in the real world, such as a person, place, business, other tangible thing, community, event, or thought. Each entity model provides a communication channel via which a user can contact a real-world person responsible for that entity model. Entity models also provide feedback information, enabling users to easily share their experiences and opinions of the corresponding real-world entity.

15 Claims, 9 Drawing Sheets

| | Person | Business | Place | Thing | Community | Thought | Event |
|---|---|---|---|---|---|---|---|
| Person | trusts / trusted by | owner of / employed by / customer of | lives at | owns | member of | thinks / subject of | sponsors / participates in / focus of |
| Business | owned by / employer of / patronized by | owns / owned by / distributor for | located at | makes / sells | interest of | subject of | sponsors / participates in / focus of |
| Place | home of | location of | located in | location of | interest of / location of | subject of | location of / focus of |
| Thing | owned by | made by / sold by | located at | type of / includes | interest of | subject of | used in / focus of |
| Community | includes | interested in | located at / interested in | interested in | interested in / interest of | subject of / interested in | sponsor of / participates in / focus of |
| Thought | thought by | is about | is about | is about | is about / interest of | subject of | is about / focus of |
| Event | sponsored by / participant / focused on | sponsored by / participant / focused on | occurs at / focused on | uses / focused on | sponsored by / focused on / participant | subject of / focused on | focus of |

FIG. 3

WORLD MODELING USING A RELATIONSHIP NETWORK WITH COMMUNICATION CHANNELS TO ENTITIES

BACKGROUND OF THE INVENTION

The present invention relates in general to information processing, and in particular to world modeling using a relationship network that provides communication channels to different entities in the network.

The World Wide Web (Web), as its name suggests, is a decentralized global collection of interlinked information—generally in the form of "pages" that may contain text, images, and/or media content—related to virtually every topic imaginable. Through the contributions of countless users, the Web has grown to become a vast, decentralized treasure trove of information. Finding information in the trove, however, can be difficult.

To make it easier to find information, an industry of search providers (e.g., Yahoo!, MSN, Google) has evolved. A search provider typically maintains a database of Web pages in which the URL (uniform resource locator) of each page is associated with various information (e.g., keywords, category data, etc.) reflecting its content. The search provider also maintains a search server that hosts a search page (or site) on the Web. The search page provides a form into which a user can enter a query that usually includes one or more terms indicative of the user's interest. Once a query is entered, the search server accesses the database and generates a list of "hits," typically URLs for pages whose content matches keywords derived from the user's query. This list is provided to the user in a search results page, typically including a page title, short abstract, and link for each hit. Since queries can return hundreds, thousands, or even millions of hits, search providers have developed sophisticated algorithms for ranking the hits (i.e., determining an order for displaying hits to the user) in hope that the pages most relevant to a given query will appear near the top of the list. Typical ranking algorithms take into account not only the keywords and their frequency of occurrence but also other information such as the number of other pages that link to the hit page, popularity of the hit page among users, and so on.

The search industry has developed other techniques to enhance the likely relevance of highly ranked hits. For instance, "local" search services have been developed to help users find nearby businesses or other establishments. A local search service generally requires the user to specify a geographic location (e.g., an address, city or postal code) before searching, then gives high rankings to hits related to establishments near the user's location. Similarly, "yellow pages" search services allow a user to search for businesses by name or category (e.g., restaurant, hotel) and geographical location. Such services typically also offer links to maps and/or driving directions to help the user locate a particular business.

Nevertheless, the Web still provides relatively little help to users in completing ordinary tasks, such as locating a good restaurant in an unfamiliar area. A yellow pages search service would provide a list of nearby restaurants or perhaps a list of nearby restaurants specializing in a particular style of food (e.g., Italian, Thai, Indian). The listings might provide links to Web sites for some or all of the restaurants, via which the user can obtain basic factual information about a restaurant such as hours, price range, or sample menus.

This information, however, is insufficient for making an optimum choice. A person selecting a restaurant usually wants to consider not only what dishes are served but also whether the food is tasty, the service friendly, or the atmosphere conducive to some personal preference. Such subjective information is usually provided in restaurant reviews, but conventional yellow pages listings generally do not provide links to opinions from secondary sources. To obtain such information, the user would generally need to pick a particular restaurant from the yellow pages listing and execute a separate search on the restaurant name, perhaps adding the term "review" or a similar keyword, then look through the search results to identify which ones actually contain reviews of the restaurant in question. To compare reviews of different restaurants, multiple searches would generally be required. Since this process can become tedious, users often decide not to even try to make an informed choice.

Similarly, users attempting to use the Web to do a variety of other everyday tasks—including selecting a contractor for home repairs, researching and purchasing consumer goods, making travel plans, and so on—generally face the prospect of performing multiple searches and manually filtering the results to find helpful information. As a result, many users are unable to exploit the trove of existing information.

In addition, users who want to share their experiences and opinions about restaurants, contractors, products, vacation experiences or other real-world concerns find it difficult to do so. In principle, anyone can publish content on the Web, but in practice it is unlikely that a Web page commenting on a topic would be found by other users, even users looking for comments on that topic.

Therefore, it would be desirable to provide information models that enable the user to efficiently collect and review information related to an object of interest.

BRIEF SUMMARY OF THE INVENTION

Embodiments of the present invention provide systems and methods for information retrieval and communication using a world model. The world model is made up of interrelated entity models, where each entity model corresponds to an entity (or abstraction) in the real world, such as a person, place, business, other tangible thing, community, event, or thought. Each entity model provides a communication channel via which a user can contact a manager (a real-world person) responsible for that entity model. Entity models also advantageously provide feedback information, enabling users to easily share their experiences and opinions of the corresponding real-world entity.

According to one aspect of the present invention, a computer system for providing information about an entity to a user includes a world model data store and a world server communicably coupled to the world model data store. The world model data store is configured to store interrelated entity models, each entity model containing information about a corresponding entity; the entity itself is preferably a real-world entity or abstraction. Each entity model further has an associated communication channel for initiating communication with a manager responsible for that one of the plurality of entity models. The world server is configured to receive a user request for an entity model, to return the information contained in the requested entity model, and to enable the user to access the communication channel associated with the requested entity model.

In some embodiments, the entity models are interrelated by relationships having a plurality of relationship types, and each relationship between two entity models is advantageously navigable in at least one direction.

In some embodiments, the world model data store is searchable, and the user request may include a search query specifying a property for the information contained in the entity models. The world server may be further configured to identify, as the requested entity model, an entity model for which the contained information matches the property specified in the search query.

Various types of information may be contained in an entity model. For example, the information contained in each entity model may include a classification of the entity model into one of a number of predefined categories. The predefined categories may include a category for entities that are persons and at least one category for entities that are not persons; examples of categories for entities that are not persons include a category for businesses, a category for places, a category for tangible things, or a category for thoughts.

Another type of information that may be contained in an entity model is structured metadata describing the corresponding entity; the structured metadata includes a plurality of fields and associated values. Still other types of information that may be contained in an entity model include feedback information relating to the corresponding entity, the feedback information being provided by users of the computer system; references to content related to the corresponding entity; text or media content related to the corresponding entity; and so on.

According to another aspect of the present invention, a computer implements a method for providing information to a user. In a data store, a number of interrelated entity models are defined, with each entity model containing information about a corresponding entity. A communication channel is associated with each of the entity models, for initiating communication with a manager responsible for that entity model. A world server (which is a computer) receives a user request for an entity model. The world server returns the information contained in the requested one of the entity models and automatically enables the user to access the communication channel associated with the requested entity model.

Access to the communication channel may be enabled in various ways. In some embodiments, enabling the user to access the communication channel includes returning the identifier of the manager together with the information contained in the requested one of the plurality of entity models. In other embodiments, the user is provided a form for entry of input to be communicated. Input from the user is received via the form, and the received input is transmitted to the manager via the communication channel.

According to still another aspect of the present invention, a computer implements a method for providing information to a user. In a data store, a number of interrelated entity models, are defined, with each entity model containing information about a corresponding entity. The information contained in at least some of the entity models includes feedback information related to the corresponding entity. A world server receives a request from a querying user for an entity model. The world server returns the information contained in the requested entity model, and in the event that the requested entity model includes feedback information, the feedback information is also provided to the querying user. In some embodiments, the world server also receives new feedback information related to a first one of the entities from a contributing user and adds the new feedback information to the entity model corresponding to the first one of the entities, thereby enabling the new feedback information to be provided to subsequent querying users.

In some embodiments, including the feedback information in the one of the entity models includes defining a communication channel for initiating communication with the contributing user, and providing the feedback information to the querying user may include enabling the querying user to access the communication channel.

According to a further aspect of the present invention, a computer system for providing information to a user includes a world model data store and a world server communicably coupled to the world model data store. The world model data store is configured to store a number of interrelated entity models, each entity model containing information about a corresponding entity. The information contained in at least some of the entity models includes feedback information related to the corresponding entity. The world server is configured to receive a user request for an entity model, to return the information contained in the requested entity model, and in the event that the requested entity model includes feedback information, to provide the feedback information to the querying user.

The following detailed description together with the accompanying drawings will provide a better understanding of the nature and advantages of the present invention.

BRIEF DESCRIPTION OF THE DRAWINGS

FIG. 3 is a matrix illustrating some relationship types that may be defined among the seven categories described above.

DETAILED DESCRIPTION OF THE INVENTION

Embodiments of the present invention provide systems and methods for information retrieval and communication using a world model. The world model is made up of interrelated entity models, where each entity model corresponds to an entity (or concept) in the real world, such as a person, place, business, other tangible thing, community, event, or thought. Each entity model provides a communication channel via which a user can contact a manager (a real-world person) responsible for that entity model. Entity models also advantageously provide feedback information, enabling users to easily share their experiences and opinions of the corresponding real-world entity.

Network Overview

Figure 1:
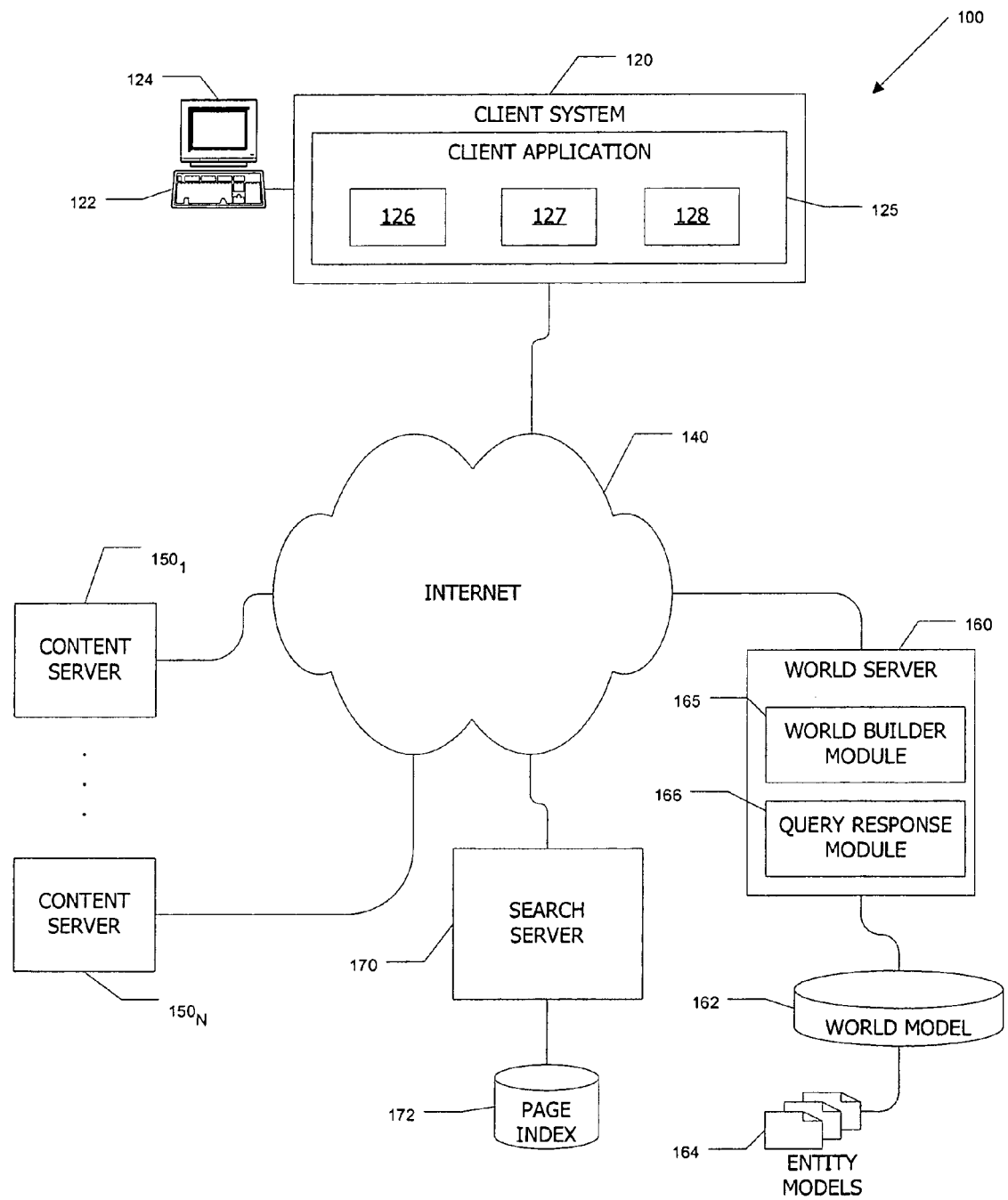
FIG. 1 is a simplified block diagram of an information retrieval and communication network including a client system according to an embodiment of the present invention.

FIG. 1 is a simplified block diagram of an information retrieval and communication network 100 including a client system 120 according to an embodiment of the present invention. In computer network 100, client system 120 is coupled through a communication network 140, e.g., the Internet, to any number of content server systems $150_1$ to $150_N$. Client system 120 can be configured to communicate with any of server systems $150_1$ to $150_N$, e.g., to access, receive, retrieve and display media content and other information (such as Web pages) and to transmit and receive messages (such as e-mail or instant messages) to and from users of server systems $150_1$ to $150_N$. Client system 120 can also be configured to communicate with a world server system 160 and a search server system 170, e.g., to perform searches, to interact with a world model as described below, and to communicate with other users of world server 160 and/or search server 170.

Several elements in the system shown in FIG. 1 include conventional, well-known elements that need not be explained in detail here. For example, client system 120 could include a desktop personal computer, workstation, laptop, personal digital assistant (PDA), cell phone, or any WAP-enabled device or any other computing device capable of interfacing directly or indirectly to the Internet. Client system 120 typically runs a browsing program, such as Microsoft's Internet Explorer™ browser, Netscape Navigator™ browser, Mozilla™ browser, Opera™ browser, or a WAP-enabled browser in the case of a cell phone, PDA or other wireless device, or the like, allowing a user of client system 120 to access, process and view information and pages available to it from server systems $150_1$ to $150_N$ over Internet 140. Client system 120 also typically includes one or more user input devices 122, such as a keyboard, a mouse, touch screen, pen or the like, for interacting with a graphical user interface (GUI) provided by the browser on a display 124 (e.g., CRT monitor, LCD display, etc.), in conjunction with pages, forms and other information provided by content server systems $150_1$ to $150_N$ or other servers. The present invention is suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any local area network (LAN) or wide area network (WAN) or the like.

According to one embodiment, client system 120 and all of its components are operator configurable using an application including computer code run using a central processing unit such as an Intel Pentium™ processor, AMD Athlon™ processor, or the like or multiple processors. A client application 125 executing on client system 120 advantageously includes instructions for controlling client system 120 and its components to communicate with server systems $150_1$ to $150_N$, 160 and 170 and to process and display data content received therefrom. Client application 125 may be transmitted and downloaded to client system 120 from a software source such as a remote server system (e.g., server systems $150_1$ to $150_N$, 160, 170 or another remote server system), or client application module 125 may also be provided on any software storage medium (floppy disk, CD, DVD, etc.) that is readable by client system 120. For example, client application 125 may be provided over Internet 140 to client system 120 in an HTML wrapper including various controls, such as embedded JavaScript or Active X controls, for manipulating data and rendering data in various objects, frames and windows.

Client application module 125 advantageously includes various software modules for processing data and media content. In one embodiment, these modules include a "world search" module 126, a user interface module 127, and an application interface (API) module 128. World search module 126 is configured for processing search requests (also referred to herein as queries) to be sent to world server 160 and/or search server 170 and search result data received from world server 160 and/or search server 170, and may also be configured for interacting with world server 160 to modify the content of world model data store 162. Specific aspects of world search module 126 are described below.

User interface module 127 is configured for rendering data and media content in text and data frames and active windows, e.g., browser windows and dialog boxes. In some embodiments, user interface module 127 includes or communicates with a browser program, which may be a default browser configured on client system 120 or a different browser. Conventional browser programs may be used. API module 128 is configured to support interfacing and communicating between client application 125 and various other applications executing on client 120, such as e-mail applications, instant messaging (IM) applications, browser applications, document management applications and others.

User interface module 127 advantageously provides user input interfaces allowing the user to enter queries for processing by world server 160 and/or search server 170. For example, where user interface module 127 includes or communicates with a browser, the user may be able to enter a URL or activate a control button to direct the browser to a search page (or site) from which the user can submit a query to world server 160 and/or search server 170 for processing. In addition or instead, user interface module 127 may include a search toolbar or other interface via which the user can enter and submit a query without first navigating to a search page. Queries entered using user interface module 127 may be preprocessed by world search module 126 prior to being sent to world server system 160 or search server 170, e.g., to remove so-called "stop words" ("the," "and," etc.), to correct spelling errors, or the like.

World server 160 maintains a world model data store 162 that stores a "world model" in accordance with an embodiment of the present invention, as described below. The world model provides a searchable set of interrelated entity models 164, where each entity model 164 advantageously corresponds to some entity existing in the real world, such as a person, business, other tangible thing, place, community, event, or thought. As described below, an entity model 164 stores various information about the real-world entity to which it corresponds. Each entity model 164 also defines at least one communication channel to a person (referred to herein as a "manager") responsible for that entity model 164; this communication channel enables any user to initiate direct communication with any entity (i.e., communication with a person responsible for that entity's representation in the world model). In some embodiments, each entity model 164 also stores feedback information about the real-world entity. This feedback information is provided by users of world server 160 as described below.

World server 160 advantageously includes a world-builder module 165 and a query response module 166 that interact with client system 120 as described below. World-builder module 165 enables authorized users to update the world model in data store 162, e.g., by creating, deleting, or modifying entity models 164 stored therein. Query response module 166 enables users to search world model data store 162 for entity models 164 that match user-specified criteria. Examples of such operations are described below.

Client system 120 advantageously is configurable to interact with world server 160 in one of two capacities: as a "user" with the ability to retrieve information from the world model, or as a "participant" with the further ability to add or modify entity models 164 in world model data store 162. Interaction as a user advantageously does not require identification or authentication of the user; thus, anyone can retrieve information from world model data store 162 regardless of whether he or she has a service account or any other relationship with a provider of world server 160. Interaction in the participant mode advantageously does require user identification and authentication procedures; for instance, a participant may be required to log in with a username (or other identifier) and password before adding or modifying any entity models 164. This user name may also be used for other purposes, e.g., to support e-mail, IM, search personalization, or other services offered by the provider of world server 160.

In some embodiments, client system 120 is further configured to communicate with a search server 170 via Internet 140. Search server 170 may be of generally conventional design. For example, search server 170 may reference various page indexes 172 that are populated with, e.g., pages, links to pages, data representing the content of indexed pages, etc. Page indexes may be generated by various collection technologies such as an automatic Web crawler (not shown); in addition, manual or semi-automatic classification algorithms and interfaces may be provided for classifying and ranking Web pages within a hierarchical category structure. In response to a search query from client system 120, search server 170 uses page index 172 to identify relevant content and returns references to the relevant content (e.g., hyperlinks, URLs or other identifiers) to client system 120. In some variations, search server 170 may return the relevant content in addition to or instead of references thereto.

Technologies and algorithms implemented on search server 170 may be generally conventional in nature, and a detailed description is omitted as not being critical to understanding the present invention.

In some embodiments, search server 170 advantageously interacts with world server 160 to enhance conventional search responses with additional information obtained from the world model data store 162. Examples of search integration with a world model are described below; however, it is to be understood that a world model as described herein may also be used without search integration.

It will be appreciated that the communication and information retrieval system described herein is illustrative and that variations and modifications are possible. The world server and search server systems may be part of a single organization, e.g., a distributed server system such as that provided to users by Yahoo! Inc., or they may be part of disparate organizations. Each server system generally includes at least one server and an associated database system, and may include multiple servers and associated database systems, and although shown as a single block, may be geographically distributed. For example, all servers of a world server system may be located in close proximity to one another (e.g., in a server farm located in a single building or campus), or they may be distributed at locations remote from one another (e.g., one or more servers located in city A and one or more servers located in city B). Thus, as used herein, a "server system" typically includes one or more logically and/or physically connected servers distributed locally or across one or more geographic locations; the terms "server" and "server system" are used interchangeably.

The search server may be configured with one or more page indexes and algorithms for accessing the page index(es) and providing search results to users in response to search queries received from client systems. The search server system might generate the page indexes itself, receive page indexes from another source (e.g., a separate server system), or receive page indexes from another source and perform further processing thereof (e.g., addition or updating of the context identifiers).

The world model may be stored in any format, provided that entity models therein can be linked to each other by navigable relationships. Where the world server system includes multiple servers, multiple copies of the world model may be provided in physically separate data stores, or different servers may access the same data store. In addition, in some embodiments, the world server system may provide multiple independent world models, with entities in a given world model being unrelated to entities in any other world model.

Computer code for implementing aspects of the present invention can be C, C++, HTML, XML, Java, JavaScript, etc. code, or any other suitable scripting language (e.g., VBScript), or any other suitable programming language that can be executed on client system 120 or world system 160 or that can be compiled to execute on client system 120 or world server system 160. In some embodiments, no code is downloaded to client system 120, and needed code is executed by a server (e.g., server 160), or code already present at client system 120 is executed.

World Model Overview

As noted above, the world model stored in world model data store 162 is made up of interrelated entity models 164. Any type of real-world entity can be represented by an entity model 164. Each entity model is advantageously implemented as a data structure that provides access to information about a real-world entity that the node represents. Many types of real-world entities can be represented, including people, places, other tangible things, events, communities, businesses, and thoughts.

Figure 2:
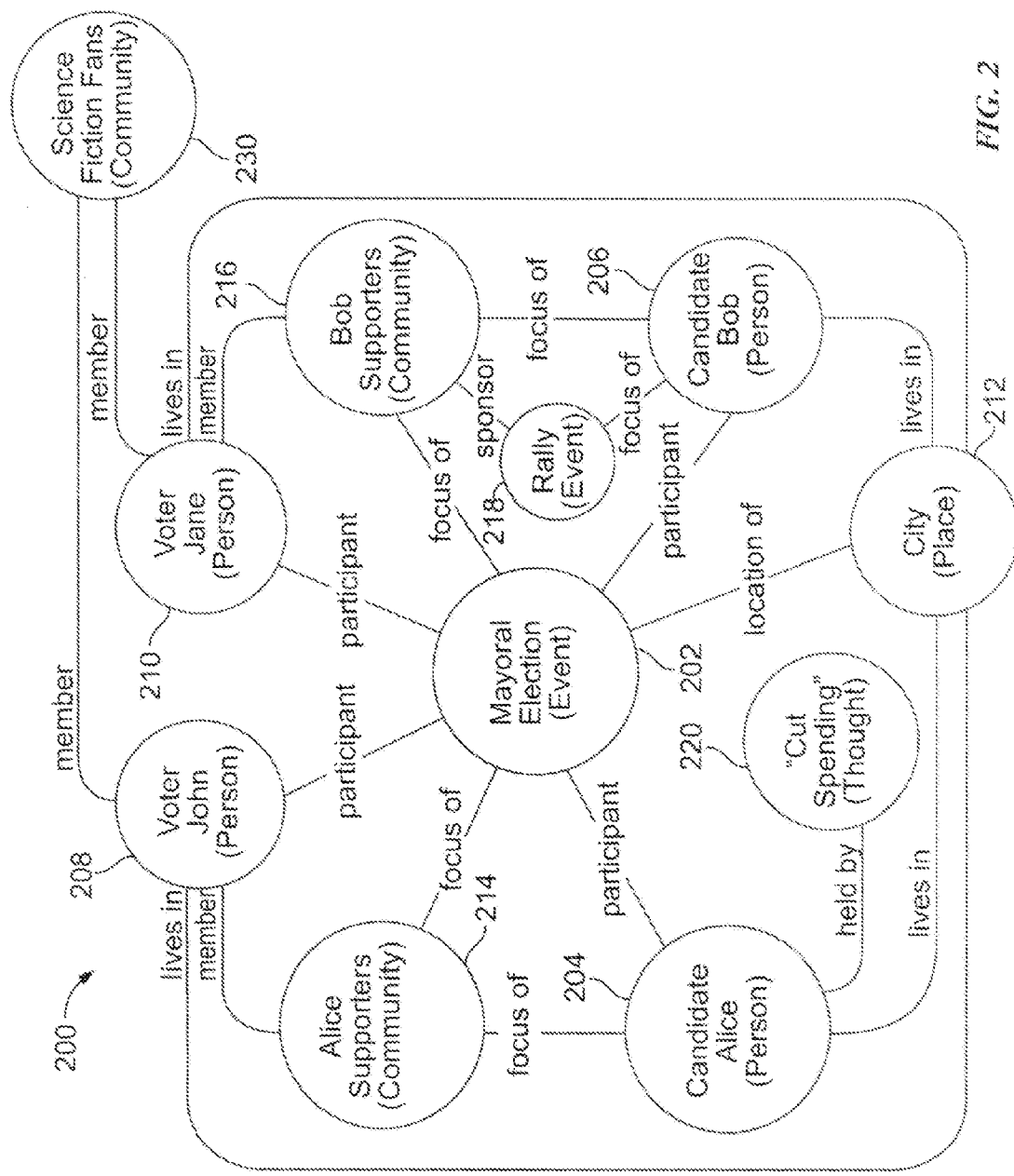
FIG. 2 is a network graph illustrating a world model depicting entities relevant to an event according to an embodiment of the present invention.

Like any collection of interrelated data objects, world model 162 can be represented visually using a network graph, with each node representing an entity model 164 and each edge representing a relationship between entity models. For instance, FIG. 2 is a network graph illustrating a world model 200 that represents entities relevant to a real-world event according to an embodiment of the present invention.

Node 202 represents the event, in this example a mayoral election. The candidates (Alice and Bob) are represented as nodes 204 and 206, respectively, each of which has a "participant" relationship to election node 202. Other participants in the election include voter Joe (node 208) and voter Jane (node 210). The election takes place in a city (node 212). Candidates Alice and Bob, as well as voters Joe and Jane, all live in this city, as indicated by "lives in" relationships connecting each of nodes 204, 206, 208, 210 to city node 212.

Each candidate has a community of supporters, and these communities are also represented in world model 200: a community of Alice supporters is represented by node 214, and a community of Bob supporters is represented by node 216. Voter Jane (node 210), who supports candidate Bob, is linked to the community of Bob supporters (node 216) by a "member" relationship; similarly, voter Joe (node 208), who supports candidate Alice, is linked to the community of Alice supporters (node 214). In this example, the community of Bob supporters is organizing a rally (event node 218) in support of Bob's candidacy. The rally (node 218) is linked to its organizers (node 216) via a "sponsored by" relationship and to its subject, candidate Bob (node 206), by a "subject of" relationship.

World model 200 can also represent abstract ideas, such as the candidates' positions on issues. Ideas are represented as "thought" nodes and can be linked to the person who holds them via a "held by" relationship. For example, node 220 represents the idea "cut spending," which is held by candidate Alice (node 204), while node 222 represents the idea "increase taxes," which is held by candidate Bob (node 206).

World model 200 is not limited to a single event; the full complexity and scope of interrelationships that exist in the real world can be modeled. For instance, voters Jane and Joe are also interested in science fiction, and both are linked to a community of science fiction fans (node 230). This community may also have other members, including people who live in different cities and who are not involved in the election represented by node 202. Accordingly, it is to be understood that while simple examples are used herein for purposes of illustration, a world model can be used to model any portion of the real world with any degree of complexity and detail that may be desired.

World model 200 advantageously allows a user to navigate among related entities. For example, a user interested in the mayoral election might first retrieve node 202, then follow the relationship links to identify the candidates, Bob and Alice (nodes 204 and 206). The user might retrieve these nodes, then follow further links to thought nodes 220 and 222 to learn about the candidates' positions. The user might also follow the "focus" links to the respective communities of supporters (nodes 214 and 216) of the candidates. From there, the user might engage in discussion about the candidates, learn about an upcoming rally in support of a candidate (node 218), and so on. As described below, some relationships may be navigable in both directions while others are navigable in only one direction.

In addition, the world model advantageously enables a user to send a message to any entity represented therein. For example, in world model 200 a user can send a message to candidate Bob (node 206) to ask a question about Bob's position on some issue. The user can also send a message to a non-person entity; for example, the user might send a message to the election (node 202), e.g., to volunteer as a poll worker, or to the city (node 212). Messages to non-person entities are advantageously routed to a world-model participant who is responsible for maintaining the corresponding node in the world model, as described below.

Entity Model

An embodiment of entity model 164 will now be described. In one embodiment, entity model 164 is implemented as a data structure that can reference other entity model data structures, e.g., using labels, pointers or other suitably persistent references, thereby allowing relationships among entity models to be defined. Particular languages and conventions for implementing data structures not critical to the present invention, and any suitable language may be used.

In some embodiments, each entity model is assigned to one of a predetermined set of categories, where each category represents a class of entities (or abstractions) existing in the real world. For example, in embodiments described herein, seven categories are used: (1) Person, for entity models representing individual human beings; (2) Businesses, for entity models representing commercial enterprises, non-profit organizations, or individuals acting as providers of goods or services; (3) Place, for entity models representing geographic locations such as buildings, cities, states, nations, and so on; (4) Thing, for entity models representing other tangible things such as consumer goods; (5) Community, for entity models representing groups of people united by a common interest or characteristic; (6) Thought, for entity models representing a tangible expression of an opinion, idea, or other mental product; and (7) Event, for entity models representing occurrences such as elections, natural disasters, sports events, and so on. In addition, some embodiments may also provide subcategories within some or all categories. For instance, the Business category could have subcategories corresponding to different kinds of businesses (e.g., restaurants, retailers, service providers) and so on. Subcategories may be further subdivided; e.g., a "restaurant" subcategory could have sub-subcategories for different types of food.

In the real world, entities are interrelated, and relationships between entities may be of different types. For instance, a person might be an owner of a business or an employee of a business. To reflect such relationships, the world model advantageously defines types of relationships that may exist among entity models belonging to the same or different categories. By way of illustration, FIG. 3 shows a matrix 300 illustrating some relationship types that may be defined among the seven categories described above. In FIG. 3, an entity model belonging to the "row" category 302 can be related to an entity model belonging to the "column" category 304 by any of the relationships in the intersection cell 306. For instance, cell 308 indicates that a Person entity model can be "owner of" a Business entity model, "employed by" a Business entity model, or a "customer of" a Business entity model.

In one aspect, Person entity models can have trust (or friendship) relationships with each other; a Person entity model may trust another Person entity model or be trusted by another Person entity model. In this aspect, the world model can include features of a conventional social network. Unlike a conventional social network, however, the world model allows other types of entities, not just users, to be included as full participants in the network, thereby providing additional avenues for categorizing, filtering and retrieving information.

Many of the relationships in FIG. 3 are logically reciprocal; for instance, if Person P is employed by Business B, then it can be inferred that Business B is the employer of Person P. However, it should be noted that not all relationships are logically reciprocal; for instance, Person P might trust Person Q even though Person Q does not trust Person P. In addition, any relationship may be defined as being navigable in one or both directions. Allowed directions of navigation may be determined automatically (e.g., based on relationship type), or they may be manually defined (e.g., by the managers of various entity models).

It is to be understood that the categories and relationships described herein are illustrative and that alternative embodiments of the present invention may provide any combination of categories and relationship types; such combinations may include all, some or none of the above categories and relationship types and may also include other categories and/or relationship types not specifically mentioned herein.

Figure 4:
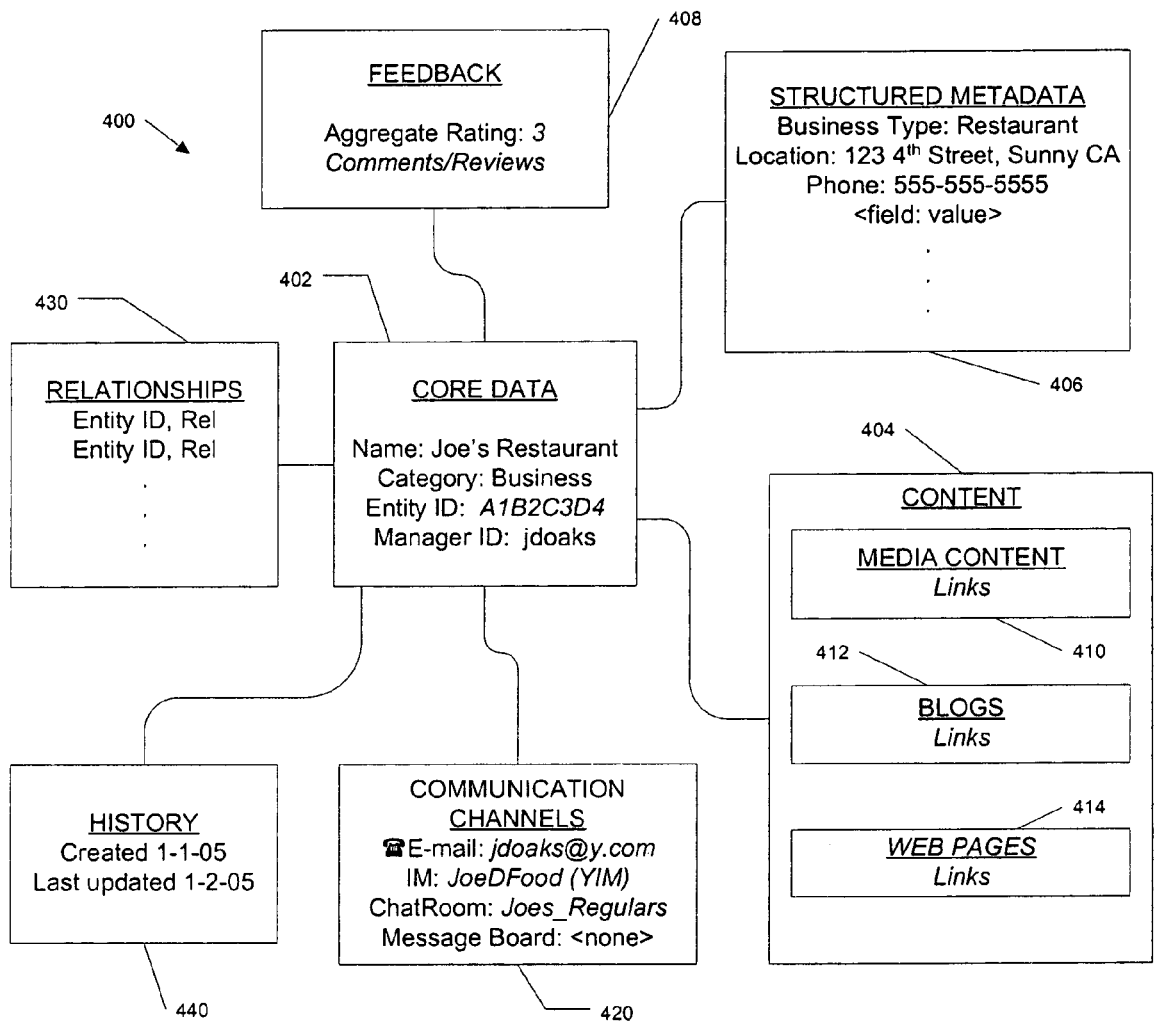
FIG. 4 is a block diagram of components of an entity model according to an embodiment of the present invention.

In addition to relationship and category information, an entity model advantageously stores other information about the real-world entity it represents. For example, FIG. 4 is a block diagram showing components of an entity model 400 according to an embodiment of the present invention. Entity model 400 includes a core section 402 that defines the entity being modeled. Core section 402 in this embodiment includes the name of the entity, a category label, a unique entity identifier (ID), and an ID of a manager for the entity. The name is advantageously understandable to a human user and specific to the real-world entity being modeled (e.g., "Joe's Restaurant," "Eiffel Tower," "Yahoo! Inc."). The category label denotes the type of real-world object that entity model 400 represents and may be selected from a group of predefined categories (e.g., the seven categories described above). The entity ID, which need not be understandable to a human user, is unique to each entity model 400 in the world model. In one embodiment, the entity ID is automatically generated by world server 160 when entity model 400 is created. Any scheme for generating IDs may be used, provided that each entity model 400 in a given world model has a different entity ID, allowing the entity ID to be used as a reference to identify related entity models as described below.

The manager ID uniquely identifies one or more "entity managers," i.e., real-world persons responsible for maintaining entity model 400 by interacting with world server 160 in the participant capacity. Only the entity manager (or in some embodiments a world model administrator) is authorized to delete or modify an existing entity model, although other participants in the world model can create, modify or delete relationships between existing entity models as described below. In some embodiments, the entity manager is required to have a service account with the provider of world server 160, and a user name associated with that account may be used as the manager ID.

The manager ID advantageously also defines a communication channel to the entity manager. For instance, in embodiments where world server 160 is maintained by an organization that also provides e-mail, IM or other communication services and where the entity manager is a user of such services, the manager ID might be an e-mail user name, IM screen name or any other profile name used by a particular person to identify himself or herself to the communication services. In other embodiments, the manager ID might be a fully-qualified e-mail address (e.g., user@server.com), an IM screen name qualified by a service provider, or any other identifier of a communication channel to a person.

In other embodiments, the manager ID may be a pointer or other reference to a Person entity model that represents the entity manager qua participant in the world model, and the Person entity model may provide an e-mail address, IM screen name or other information that can be used to communicate with the entity manager.

Structured metadata section 406 stores a number of field-value pairs related to the real-world entity being modeled. The metadata fields may depend on the category to which the entity model belongs. For instance, in the case of a Person, metadata fields might include name, age, sex, address, occupation, or the like. In the case of a Business, metadata fields might include location, telephone number, type of business, or the like. Metadata fields may be varied as desired. In some embodiments, some or all of the structured metadata fields may be user-defined.

Entity model 400 also includes a content section 404. Content section 404 provides content (or links to content) that pertains to the real-world entity being modeled. In preferred embodiments, some or all of this content may be stored on servers other than world server 160, and content section 404 advantageously includes references (e.g., a URL or other identifier) to external content. Content for inclusion in section 404 may be selected by the entity manager, or they may be automatically added or updated. In some embodiments, portions of content section 404 are automatically updated while others are manually updated.

Any type of content related to the entity may be linked. For instance, media content item 410 provides references to media content such as photographs or other images of the real-world entity, audio or video clips featuring the real-world entity, or clips reporting on or discussing the real-world entity. Blog item 412 provides references to blogs or blog entries that discuss or were authored by the real-world entity. Web page item 414 provides references to web pages pertaining to the real-world entity. It is to be understood that there is no requirement that all possible types of content be linked to a particular entity model and that links to other types of content may also be provided in addition to or instead of the types described herein.

In some embodiments, references to all available content related to the real-world entity (or links to such information) may be collected in content section 404. In other embodiments, references to particularly significant or representative information may be selected for inclusion in content section 404. For instance, if the real-world entity is the Eiffel Tower (for which thousands of photos are available on the Web), one might choose to include references to a few representative photos rather than references to every available photo. Similarly, if the real-world entity is a corporation, one might choose to selectively reference the corporation's Web site, a current stock market quote, and a small number of recent news items reporting on the corporation's activities rather than attempting to reference every Web page that mentions or discusses the corporation.

Feedback section 408 stores evaluative information about the real-world entity that may be contributed by participants in or users of the world model. For example, as described below, users may be invited to rate their experience with the real-world entity (e.g., from zero to five stars) and/or to provide free-text comments (also referred to herein as reviews) on the real-world entity. Such user feedback is advantageously collected by world server 160 and incorporated into feedback section 408 of the corresponding entity model. In one embodiment, feedback section 408 includes an aggregate rating derived from all received user feedback and also provides access to the comments. In some embodiments, a comment on one entity can be represented as a Thought entity model, and feedback section 408 may contain a reference to that Thought entity model. The Thought entity model advantageously provides a communication channel to the user who submitted the comment.

Entity model 400 also defines at least one communication channel 420 for communicating with the entity model's manager or for communications pertaining to the entity (either the real world entity or the entity model). These channels advantageously define communication paths that can be activated by a user who retrieves entity model 400 from world model data store 162; the path can be defined by specifying a communication medium to be used and a particular destination within that medium. For instance, in one embodiment, communication channels 420 may include any or all of: an e-mail channel 422 specifying a username and mail server; an IM channel 424 specifying an instant messaging service and a screen name; a chat room channel 426 specifying a service provider and chat-room name; or a message board channel 428 specifying a service provider and a message board name.

Preferably, at least one channel is defined as the default communication channel (indicated by the telephone symbol 409 in FIG. 4), and messages sent via this channel are delivered to the manager of the entity model. For example, if the manager identifier in core section 402 of data structure 400 correlates to a user name jdoaks on an e-mail system Y.com (which may be under common control with world server 160), e-mail channel 422 can be defined to transmit e-mail messages to jdoaks@Y.com. Similarly, if the manager identifier correlates to a screen name JoeDFood on an IM system YIM (which may be under common control with world server 160), then IM channel 424 can be defined to transmit an instant message to JoeDFood via system YIM.

Other channels can be defined to facilitate multi-user discussion of the real-world entity to which the model pertains (or possibly discussion of the entity model). For example, a chat room channel 426 may be defined, and a user who has retrieved entity model 400 from world model data store 162 can use channel 426 to enter a chat room and discuss the entity in real time with other users. Message board channel 428 may be configured to allow users to post messages about the entity and to view and respond to postings from other users.

Relationships section 430 defines relationships between the entity model and other entity models in the world model. For example, relationship section 430 may store "Entity ID-Rel" pairs, where "Rel" denotes one of the defined relationship types (e.g., as shown in FIG. 3) and "Entity ID" is the entity ID of the related entity model. Relationships may be defined by the manager of entity model 400, by a team of administrators employed by an operator of world server 160, or by automatic processes for detecting relationships between entities; examples are described below.

For navigation purposes, each relationship is advantageously defined as a unidirectional (outgoing) reference. For example, a Business entity model might have an "employer of" reference to a Person entity model for each of its employees. Bidirectionally navigable relationships between a pair of entity models can be established by defining an appropriate relationship within both entity models; e.g., whenever an "employer of" relationship from a Business entity model to a Person entity model is defined, a corresponding "employed by" relationship from that Person entity model to that Business entity model can also defined.

History section 440 may be used to store historical information about entity model 400, such as its date of creation and/or last modification, identifier of the participant who created it, information pertaining to updates (e.g., a log of what was changed and when), and so on. Historical information about the real-world entity would advantageously be provided through content section 404 (e.g., through a reference to a Web page describing the real-world entity's history). In some embodiments, history section 440 is available for any user to review; in other embodiments, access is restricted to the entity manager and world model administrators. History section 440 may be automatically updated when entity model 400 is modified, as described below.

It will be appreciated that the entity model data structure described herein is illustrative and that variations and modifications are possible. Some or all elements described herein may be omitted, and elements not described herein may be added or substituted without departing from the spirit or scope of the invention.

In some embodiments, a group of persons can share responsibility for maintaining an entity model. For example, a manager ID might correspond to an e-mail list name that forwards received messages to multiple recipients. Alternatively, the entity model data structure may support a list of entity managers, with a manager ID being provided for each manager. In some embodiments, communications directed to the entity may be forwarded to every manager ID in the list of entity managers; in other embodiments, one manager ID may be designated to receive incoming communications directed to the entity, while other manager IDs can be used to modify the entity model but not to receive communications directed to the entity.

Entity Managers and Virtual IDs

As noted above, each entity model 400 has an entity manager, i.e., a specific real-world person responsible for maintaining that entity model 400. The entity manager is advantageously identified using a virtual ID that is associated with the real-world person; in one embodiment, the virtual ID might be a username selected by the real-world person for purposes of interaction with world server 160.

In some embodiments, the virtual ID is a reference to a Person entity model 400 in the world model. The virtual ID may also be an e-mail user name, a fully qualified e-mail address (e.g., including a domain name), an IM screen name, or any other information usable to define a communication channel to the entity manager. Note that in the case of a Person entity model that represents a world-model participant, the virtual ID is advantageously of the latter type. For Person entity models representing historical figures or other non-participants, the virtual identifier may be a reference to a Person entity model that does represent a participant.

A real-world person who is a world-model participant may choose to create multiple Person entity models to represent himself or herself in the world model. For example, the participant may choose to have separate Person entity models reflecting different real-world roles (e.g., career, social, family, etc.) that the person may have. The participant can elect to use the same communication channel for each of his or her Person entity models or to use different communication channels for different Person entity models. For instance, the participant may choose to direct communications related to her career to one e-mail address and communications related to her social activities to a different e-mail address.

Further, each Person entity model may provide different information about the real-world person it represents. Since a user of the world model can navigate relationships from various entity models to a Person entity model, the use of multiple Person entity models can help an individual control access to his or her personal information. For instance, a participant might choose to provide information his or her age and sex in a "personal" Person entity model but not in a "career" Person entity model.

Figure 5:
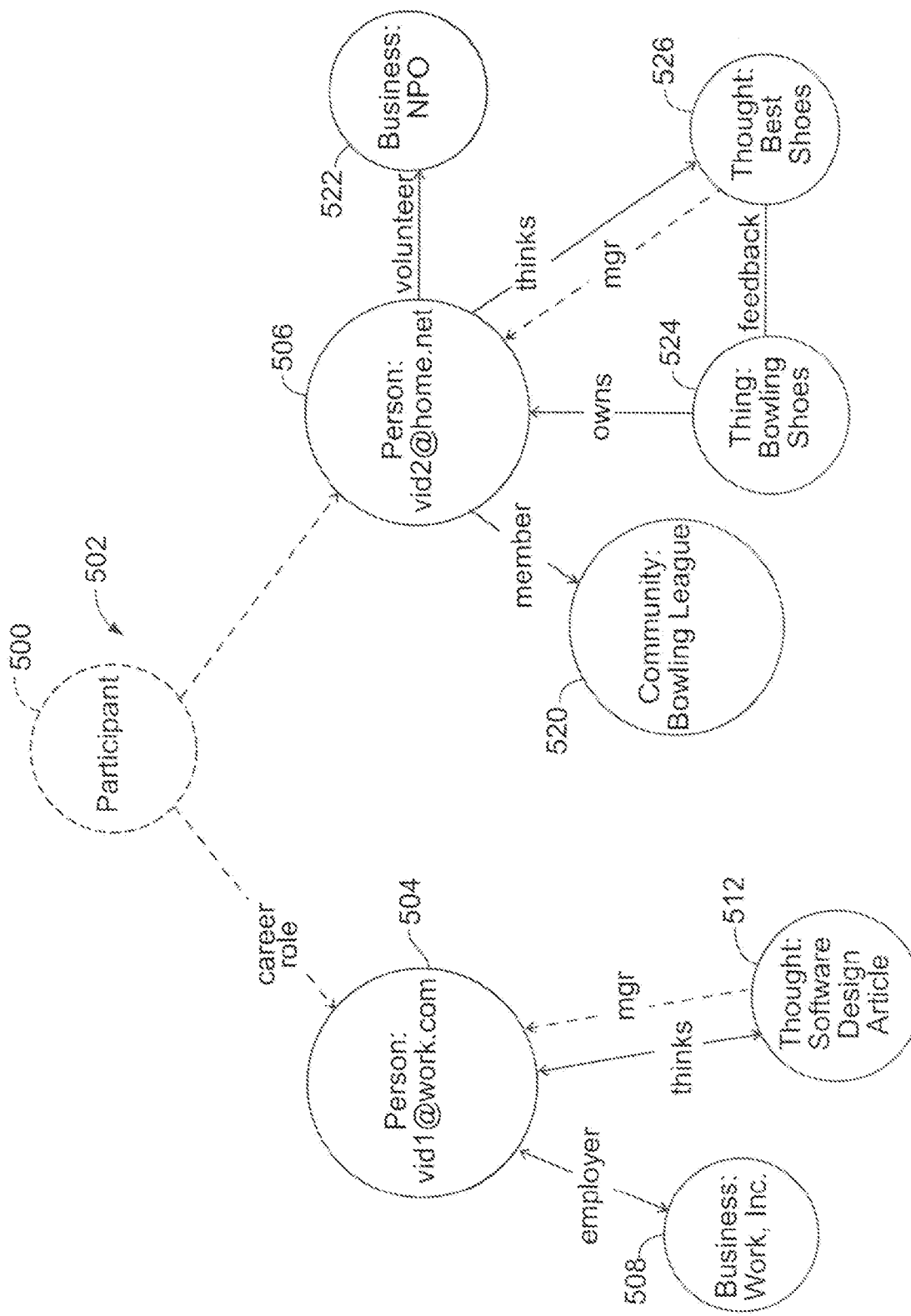
FIG. 5 is a network diagram illustrating a participant (dotted oval) in relationship to a world model according to an embodiment of the present invention.

By way of illustration of the connection of a real-world participant to a world model, FIG. 5 is a network diagram illustrating a participant 500 (dotted oval) in relationship to a world model 502. Participant 500 maintains two Person entity models 504, 506. In this example, Person entity model 504 is associated with a "career" role and has a virtual ID that directs communications to a work e-mail address (vid1@work.com); person entity model 506 is associated with a "social" role and has a virtual ID that directs communications to a home e-mail address (vid2@home.net). It is to be understood that both of these e-mail addresses are owned by participant 500.

"Career" entity model 504 has relationships to other entity models that reflect real-world relationships between participant 500 and other real-world entities. For example, participant 500 is employed by Work, Inc. This relationship is reflected in the "employment" relationship (line 510) between "Career" entity model 504 and a Business entity model 508 that represents Work, Inc. It should be noted that participant 500 might or might not be the entity manager for Business entity model 508

Similarly, a thought by participant 500 related to her work can be represented as a Thought entity model 512. The dashed arrow 514 (labeled "mgr") indicates that participant 500, via her "Career" entity model 504, is the manager of Thought entity model 512. For instance, suppose that participant 500 wrote an article on the future of her industry; that article (or a link to it) could be included in Thought entity model 512 (e.g., in information section 408 as shown in FIG. 4). Any user of world server 160 can locate the Thought entity model 512 corresponding to the article and contact the author (participant 500) by initiating communication with the entity manager of Thought entity model 512, as described below.

FIG. 5 also illustrates a number of other relationships. For example, participant 500 is a member of a bowling league and also a volunteer for a non-profit organization (NPO). These relationships are reflected by the relationships between "Social" entity model 506 and entity models 520, 522 that represent the bowling league (as a Community) and the NPO (as a Business), respectively. Participant 500 also owns a pair of bowling shoes; that brand of shoes is represented by a Thing entity model 524. Her (in this case favorable) opinion of these shoes is reflected in a Thought entity model 526 that is related to Thing entity model 524 and also to "Social" entity model 506. In one embodiment, Thought entity model 526 is referenced in feedback section 408 of Thing entity model 524, and the content of Thought entity model 526 is made accessible via Thing entity model 524 (as described below).

It is to be understood that FIG. 5 is illustrative and not limiting. A participant in the world model may choose how many Person entity models to maintain and the purposes for which each will be used. In some embodiments, an "alias" relationship may be definable between Person entity models that represent the same real-world person, allowing navigation among such Person entity models.

Creating and Updating Entity Models

Creation and updating of the world model will now be described. In preferred embodiments, the world model is created and updated by creating and updating the interrelated entity models, and world-model participants can create and update entity models via client application 125 (FIG. 1), which interacts with world-builder module 165 of world server 160.

Figure 6:
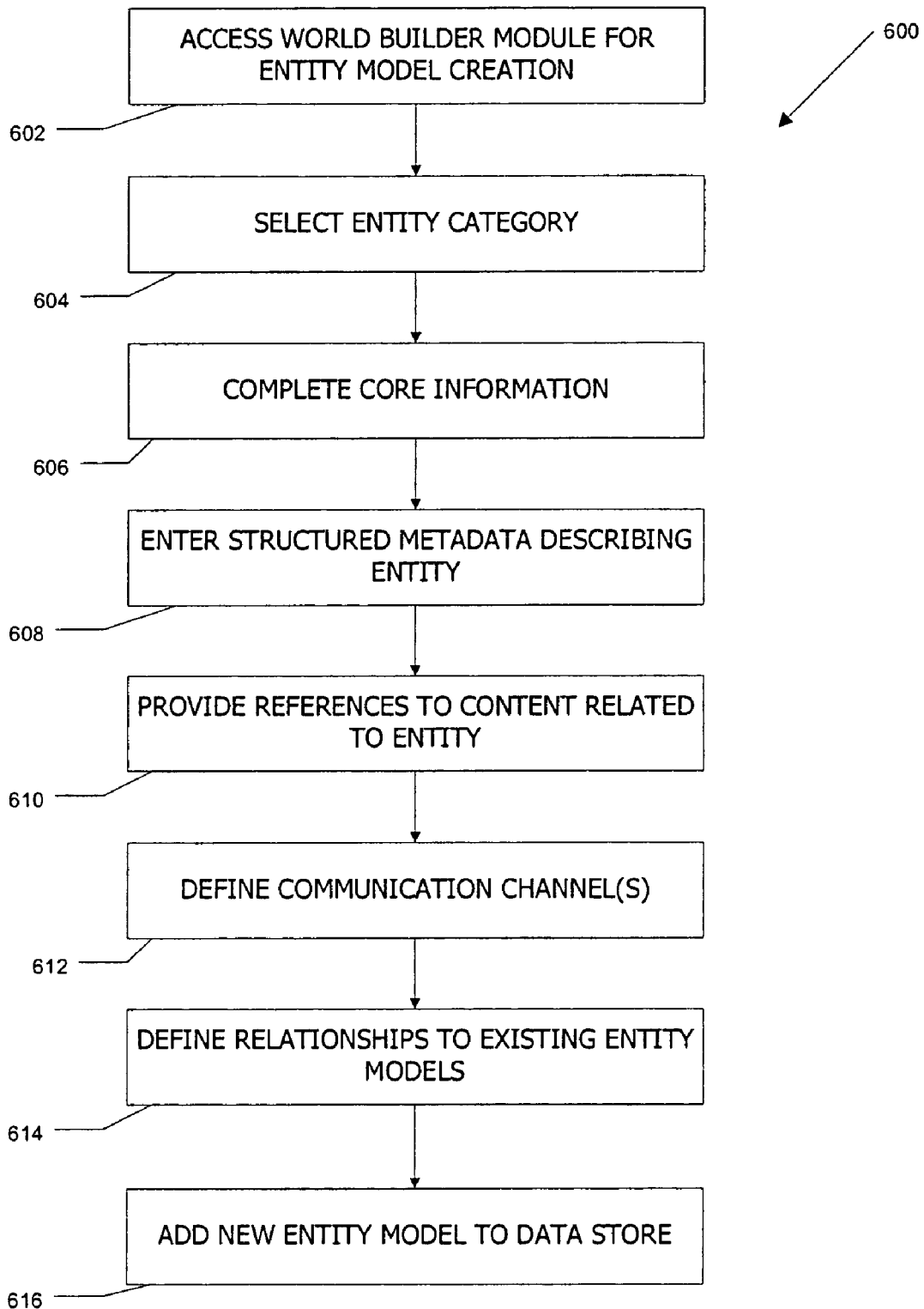
FIG. 6 is a flow diagram of a process for adding an entity to a world model according to an embodiment of the present invention.

FIG. 6 is a flow diagram of a process 600 for adding an entity to a world model according to an embodiment of the present invention. During process 600, a world-model participant provides data defining a new entity model 400 to world-builder module 165 of world server 160. Data may be provided using a suitable graphical user interface (e.g., a form with various text fields, pull-down menus, check boxes, radio buttons or the like), a sequence of prompts requesting particular information, or the like. It will be appreciated that a particular user interface is not critical to the present invention, and design of suitable user interfaces will be straightforward in view of the present description.

Process 600 begins when a world-model participant accesses world-builder module 165 of world server 160 (step 602). Step 602 may include a participant authentication (e.g., login) procedure, downloading code from world server 160, or the like, and may further include issuing a specific instruction to initiate creation of a new entity model.

At step 604, the participant selects a category for the new entity model 400, e.g., from a list of predefined categories. The selected category may be used to control various options at subsequent steps, such as which structured metadata fields are available or required, which types of relationships to other entity models can be defined, etc.

At step 606, the core information for entity model 400 is completed. For example, the participant may specify a name for the new entity model and may be prompted to identify one or more entity managers. In some embodiments, the participant who creates the entity model is identified as manager by default; the participant may be allowed to identify one or more co-managers. The entity ID is advantageously automatically generated by world-builder module 165 and may be generated during step 606 or another step in process 600 (e.g., when the new entity model is added to world model data store 162).

At step 608, the participant inputs structured metadata 406 for the new entity model 400. In some embodiments, certain fields of structured metadata may be required for some categories of entity models. For example, for a Business entity model, "Business Type" and "Location" fields may be required. Other fields might be optional, e.g., for a Person entity model, a "Birthdate" or "Age" field might be optional. Where user-defined metadata fields are supported, the user may input both the field name and an associated value.

At step 610, the participant populates content section 404 by linking content items with the new entity model 400. In one embodiment, the participant may specify a URL, a title, and a type (e.g., media, web, blog, etc.) for each content item to be linked. In other embodiments, other techniques for locating and identifying information items may be substituted. For instance, in one alternative embodiment, the participant may provide actual content rather than a reference thereto.

At step 612, the participant defines at least one communication channel 420 for the entity model 400. For example, a GUI may present a list of check boxes for selecting one or more channels. Some or all of the channels may be pre-addressed; e.g., an e-mail or IM address might be automatically generated from the entity manager's user name. Other channels might not be pre-addressed and step 612 may include prompting the participant to complete the address. For instance, the participant can be prompted to provide a name or other identifier for a chat room or message board communication channel. The participant may also be prompted to select a communication channel to be used for communication directed to the entity.

At step 614, relationships of the new entity model 400 to existing entity models 400 in world model data store 162 are defined. In one embodiment, some relationships are automatically defined, e.g., based on structured metadata fields provided at step 608. For instance, if the metadata includes a "Location" filed, a relationship to a Place entity model representing that location can be automatically defined. The participant can also select other entity models 400 and define relationships to those entity models 400. In some embodiments, the participant might access a search-and-navigation interface to world model data store 162 in order to identify entity models that should be related. The search-and-navigation interface may include a network view, similar to FIGS. 2 and 5, as well as other components; examples of search-and-navigation interfaces are described below.

Depending on the nature of the relationship, the new entity model or the existing entity model or both might be modified. For instance, it may be desirable to require that certain relationships be navigable in both directions (e.g., from employer to employee and vice versa). In such cases, when the relationship is defined from the new entity model 420 to an existing entity model 400, it is useful to automatically modify the existing entity model 400 to support navigation in the reverse direction.

At step 616, after all information has been entered, the participant commits the new entity model to world model data store 162. After the entity model has been committed, it becomes accessible to other users via various search and navigation interfaces and tools, examples of which are described below. In some embodiments, the new entity model is stored on client system 120 during process 600 and communicated to world server 160 at step 616.

It will be appreciated that the entity model creation process described herein is illustrative and that variations and modifications are possible. Steps described as sequential may be executed in parallel, order of steps may be varied, and steps may be modified or combined. In some embodiments, a creation GUI may be designed as a series of sequentially-displayed forms, with each form containing controls and prompts for entering different types of information (e.g., core data on a first form, metadata on a second form, etc.), with "Back" and "Next" controls allowing the creator to navigate among the series of forms until all desired information has been entered. Other interfaces may also be substituted. In addition, while process 600 has been described with reference to the components and organization of entity model 400 of FIG. 4, it is to be understood that process 600 may be adapted for use with different data structures.

World builder module 165 advantageously also supports modification of an entity model 400 that is already in world model data store 162. The modification process may be generally similar to process 600, except that the modification process would begin with the participant retrieving an existing entity model from data store 162 and operating the user interface to make changes to the existing information, which can be displayed on the various forms or elsewhere for the participant's convenience.

In preferred embodiments, modification to content section 404 and communication channels section 420 for an existing entity model can be made only by the entity manager of that entity model. Where content section 404 provides a link to external content (e.g., a web page or site), modification of the external content is not controlled by world server 160. Feedback section 408 is advantageously not modifiable by the entity manager; instead, any user or participant can add feedback information to any entity model 400, and feedback information can be removed only by a world model administrator.

In some embodiments, world builder module 165 automatically updates history section 440 for entity model 400. For instance, history section 440 may be automatically populated with creation information (date, time, creator's ID) during step 616 of process 600; additional entries may be added whenever modifications are committed to world model data store 162.

As noted above, in some embodiments, some or all relationships 430 between two entity models 400 might be modifiable by the entity manager of either entity model. For example, if the manager of an entity model "A" adds a bidirectionally navigable relationship to an entity model "B," then entity model B can be automatically modified to include a reciprocal relationship to entity model A, regardless of whether entity models A and B have the same manager. This automated approach avoids any need for multiple entity managers to coordinate their updates while still providing reliable bidirectional navigation for some or all relationships. In preferred embodiments, the world model administrator defines rules for which relationship types are automatically bidirectionally navigable.

Building a World Model

It is contemplated that world model data store 162 can be initially empty and that its content can be developed over time by the activities of various world model participants. To attract users to become participants and provide information to world model data store 162, it may be helpful for world model administrators (e.g., employees of the organization supporting world server 160) to seed data store 162 with entity models for various objects. For example, an existing Internet-based information and communication service provider may have amassed a directory of businesses, events, places, communities, things, people, and/or thoughts. Information from that directory can be used to define entity models for any or all of the directory items, thereby seeding data store 162.

Some or all of the entity models might initially be managed by a world model administrator. A participant may request to become manager of a particular entity model, with the request being granted or not at the administrator's discretion. For instance, in the case of a Business entity model, the administrator might consider whether the user is affiliated with the real-world business represented by the entity model. In addition, in some embodiments, world model administrators may assume ongoing responsibility for creating and maintaining certain entity models representing entities of general interest for which it is difficult to identify an appropriate individual to act as manager (e.g., entity models representing news events such as elections or natural disasters).

In some embodiments, the world model administrator has full access to all entity models in data store 162. The world model provider may define rules governing the content and appropriate use of entity models, and the administrator can advantageously modify or remove any entity model found to be in violation of such rules.

In some cases, entity models might be automatically updated to reflect changes in real-world relationships that can be detected by or reported to world server 160. For example, suppose that a communication service provider maintains world server 160 and also offers registered users the ability to join various Internet-based common-interest groups (e.g., via a service such as Yahoo! Groups). The world model advantageously includes a Community entity model for each group and a Person entity model for each registered user of the communication service provider. If a registered user joins a group, that transaction can be reported to world server 160, which can modify the Person and/or Community entity models to reflect the user's membership in the group.

User Interaction with World Model

Figure 7:
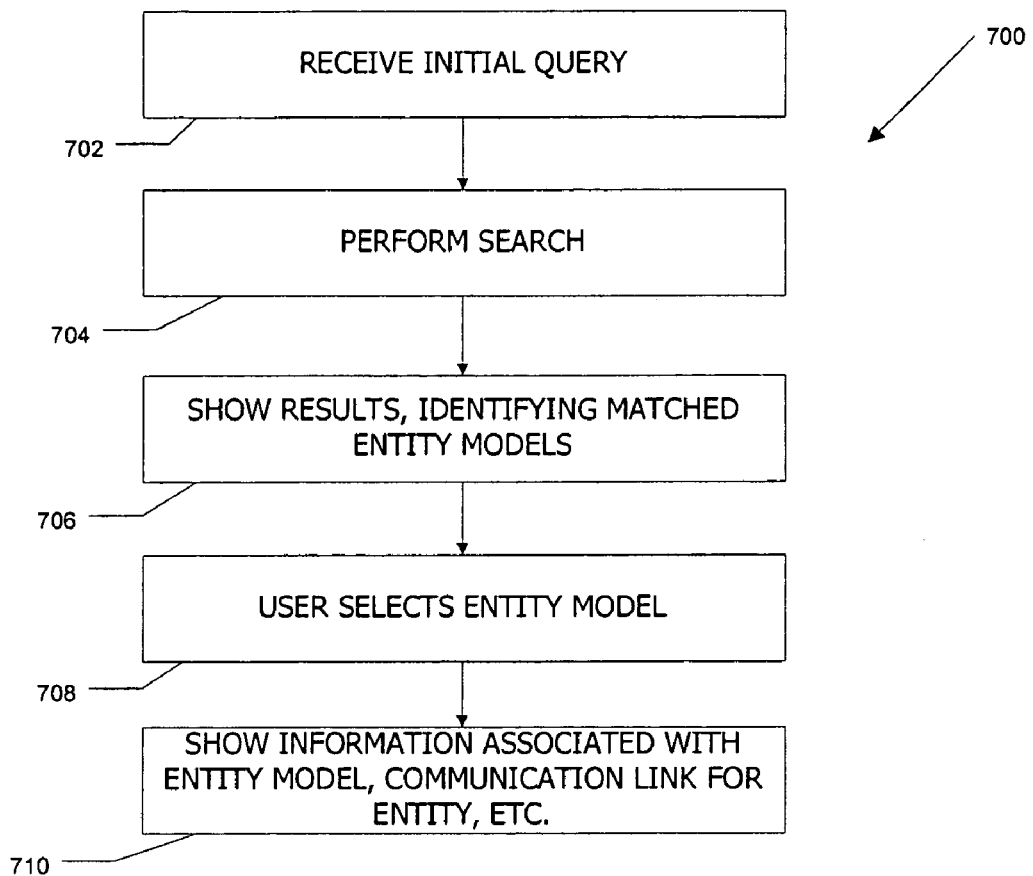
FIG. 7 is a flow diagram of a process for user interaction with a world model according to an embodiment of the present invention.

A user, who in preferred embodiments might or might not be registered with the provider of world server 160, can access world model data store 162 to facilitate information retrieval in a variety of contexts. FIG. 7 is a flow diagram of a process 700 for user interaction with world model data store 162 according to an embodiment of the present invention. Process 700 may be implemented in system 100 of FIG. 1 by world search module 126 of client application 125, which interacts with query response module 166 of world server 160.

At step 702, the user submits a query to world server 160. In one embodiment, the user navigates a conventional Web browser to a page providing a search interface to world server 160 and submits the query via this page. The search interface page may allow the user to specify keywords and to limit the search for those keywords to the entity name or to a particular structured metadata field. The user may also be able to restrict the search to a particular category of entities, indicate a preference for entities located near a specified geographic location, require a minimum aggregate rating, or the like. In some embodiments, the search interface page provides a form with various prompts to assist the user in formulating a query. Conventional form interfaces or other interfaces for searching structured data can be used.

In another embodiment, the user may submit a query to world server 160 indirectly, e.g., by submitting a conventional query, such as a list of terms, via a conventional search interface to search server 170, which forwards the query to world server 160. The user might or might not be informed in advance that the query is to be forwarded.

At step 704, the search is performed. In one embodiment, world server 160 uses one or more of the query terms as keywords for searching corresponding elements of the entity model data structure. In some embodiments, world server 160 may apply heuristic algorithms to determine which element(s) of the entity model data structure to search based on the query terms and other settings provided by the user. Where world server 160 interacts with search server 170, e.g., receiving queries forwarded by search server 170, search server 170 may execute a conventional Web search in parallel with the world model search.

At step 706, search results, including links to matching entity models from world model data store 162, are returned to the user, e.g., in the form of a search results Web page listing the matched entity models. In embodiments where a conventional Web search is performed in parallel with the world model search, the matched entity models may be returned in a separate section of the results page. The list is advantageously provided in a format that enables the user to select an entity model for more detailed viewing, for instance by clicking on a hyperlink. Viewing of entity models is described below.

In some embodiments, the matched entity models might be returned in a format other than a list. For example, where the user has requested a "local" search, i.e., a search that is constrained in some way by a geographic location, or where world server 160 has inferred that a local search is desired, matched entity models might be shown by reference to locations on a map. A map of the local area can be displayed, and icons on the map (numbers, other symbols, thumbnail images, or the like) can be placed on the map to identify locations of real-world entities corresponding to the matched entity models. The icons may be clickable hyperlinks allowing the user to select an entity model for viewing; a viewing interface is described below. In other embodiments, a network graph similar to those of FIGS. 2 and 5 might be used to display the matching entity model as well as related entity models; nodes in the graph may be clickable hyperlinks. In still other embodiments, an appropriate result format (e.g., list, geographic map, network graph, or other formats) may be selected heuristically based on characteristics of the search query, or the user may be prompted to select a format.

At step 708, the user selects an entity model of interest, e.g., by clicking on the link to that entity model. At step 710, an "entity view" is displayed. The entity view advantageously displays information from the entity model in a user-readable form. In preferred embodiments, the user can interact with the displayed information to explore the world model. For instance, the user may be able to retrieve information and user feedback about the entity, communicate directly with the entity, or navigate to related entity models in the world model.

Figure 8:
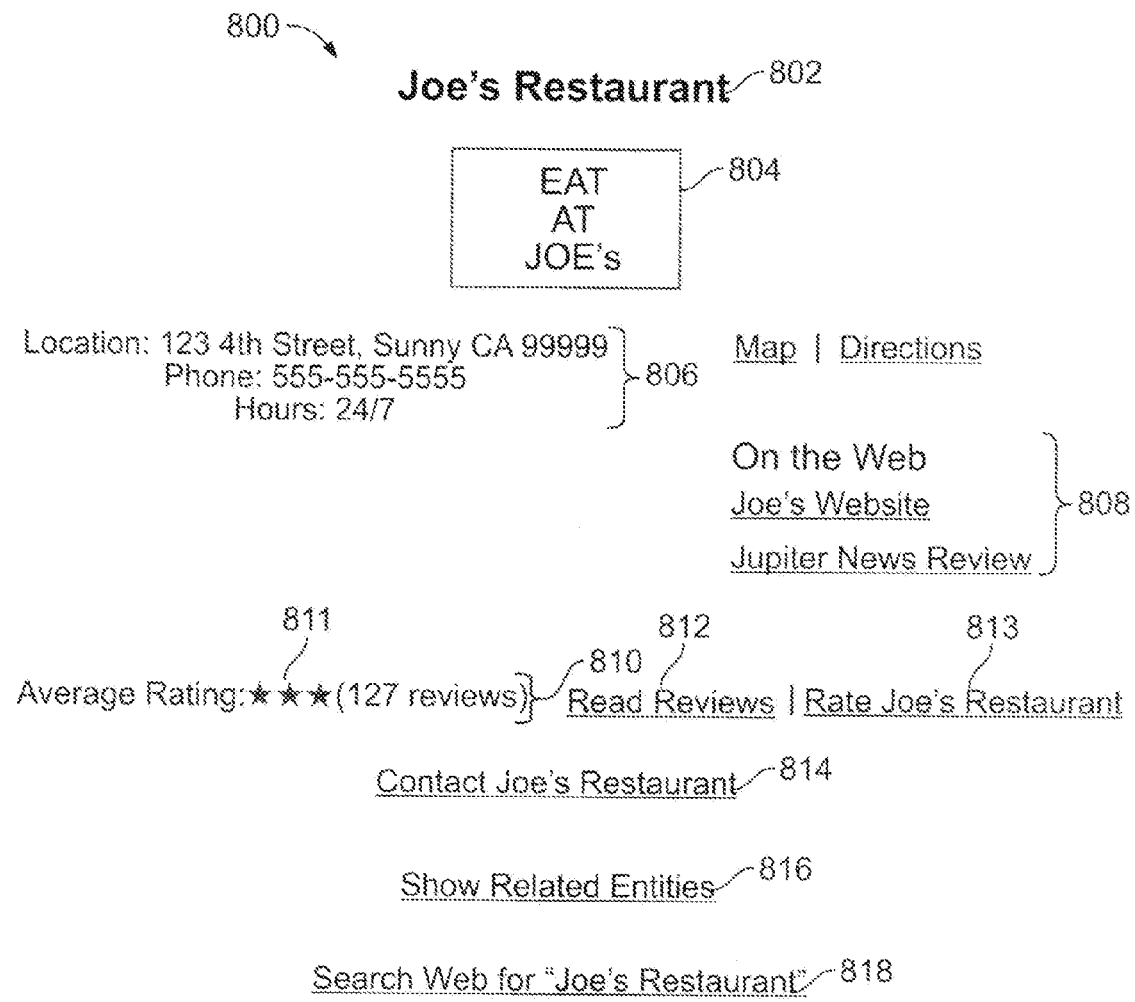
FIG. 8 is an illustration of a Web page for interacting with an entity model according to an embodiment of the present invention.

By way of example, FIG. 8 illustrates an entity view implemented as a Web page 800 according to an embodiment of the present invention. The entity name 802 ("Joe's Restaurant") is shown at the top. A still picture, animation, video clip, audio clip or one or more other media item 804 may be included in page 800. This item can be selected from media content section 410 of data structure 400. Selection of a media item to be displayed as item 804 is advantageously controlled by the manager of the entity model.

Section 806 displays selected fields from structured metadata 406 of data structure 400, thus providing basic factual information about the entity (e.g., location, hours, and the like in the case of a business). In some embodiments, the entity manager may select which metadata fields are displayed. In other embodiments, the selection of metadata fields to display depends at least in part on the entity category, and the entity model creation interface (described above) may include indicators as to which fields will appear on page 800. A link may be provided for viewing additional metadata.

Web site links 808 advantageously provide links to the Web sites identified in Web Pages section 414 of entity model 400. The initial display may be limited to a small number (e.g., 2, 5, 10) of links, and a "More" button or other control may be provided to allow the user to view additional links.

Section 810 provides feedback information 408 about the entity. The average rating for the real-world entity is shown at 811, and a link 812 enables the user to read previous reviews (or comments) from other users. The previous comments may be displayed in a separate Web page or expanded in-line in page 800 as is known in the art. Where the previous comments are stored as Thought entity models, a communication channel to the user who posted the comment is advantageously defined (as is the case for all entity models), and the comment listing advantageously provides a control for activating the communication channel to the commenter. Thus, a user with questions about another user's comment can communicate directly with that user.

Another link 813 is provided to enable the user viewing page 800 to submit feedback on Joe's Restaurant. Link 813 may direct the users to a feedback form of generally conventional design, prompting the user to enter a rating (e.g., zero to five stars) as well as free-text comments. In some embodiments, only registered world-model participants who have signed in to world server 160 are authorized to submit feedback, and a user who selects link 813 without being signed in may be prompted to sign in before submitting feedback.

In one embodiment, world server 160 processes the feedback form by creating a Thought entity model representing the new comment; the new Thought entity model is related to the entity model that is the subject of the review (e.g., via a reference in feedback section 408), and the user/participant who contributed the review is identified as the entity manager and is authorized to update or remove the feedback information. The new Thought entity model advantageously also has a "thought by" relationship to the Person entity model corresponding to that user/participant.

In preferred embodiments, the entity manager for a given entity model cannot submit feedback on that entity or remove feedback submitted by other users. This restriction advantageously prevents the manager from selectively removing negative feedback or loading the entity model with positive feedback To prevent abuse of the feedback feature, world model administrators advantageously are authorized to remove feedback items that are determined to be inappropriate (e.g., items that are irrelevant to the entity, obscene, abusive, or the like). A mechanism for reporting inappropriate feedback to the administrators may also be provided, e.g., via a link on the page displaying the feedback.

Link 814 opens the default communication channel defined in section 420 (e.g., an e-mail to jdoaks@y.com), enabling the user to communicate with the entity. In one embodiment, link 814 is operable to open an application program for the appropriate communication channel (e.g., an e-mail program) with the entity-manager's address pre-inserted. In other embodiments, a Web-based communication form for sending e-mail or instant messages to an unidentified recipient might be used. In some embodiments, neither page 800 nor the communication form actually displays the user ID of the entity manager; thus, from the user's perspective, the user is simply sending a message to the entity.

Link 816 allows the user to view related entity models. In one embodiment, following link 816 opens a window that displays a network graph of entities related to the currently viewed entity (Joe's Restaurant in this example); such a display may be somewhat similar to FIGS. 2 and 5 described above, and each node may be a clickable (or otherwise selectable) link. In some embodiments, all related entity models up to some maximum degree of separation (e.g., 2) from the current entity may be shown. In other embodiments, interface control elements may be provided either on page 800 or on the network graph page to enable the user to specify criteria for selecting entities to be shown. For instance, a user might be able to request a view of other businesses (or specific kinds of businesses such as stores or movie theaters) located in the same city as the currently viewed entity. In an alternative embodiment, the user may select the format for displaying the related entities; options may include a list format, a map format, a network graph format, and so on.

Search link 818 allows the user to perform a Web search using the entity name. In some embodiments, selecting link 818 instructs world server 160 to formulate a query and submit the query to search server 170. The query advantageously includes the entity name and may also include other search terms selected from the structured metadata 406 or other portions of entity model 400. In some embodiments, the user may be prompted to add search terms or to edit the search terms generated by world server 160.

An entity view interface advantageously enables a wide variety of interactions with a particular entity, including communication with the entity as well as viewing and providing feedback about the entity. Use of the particular interfaces described herein is not required.

USE-CASE EXAMPLES

To illustrate some ways in which world server 160 can facilitate everyday tasks, specific use-case examples will now be described. In these embodiments, world server 160 may provide situation-specific interface tools (e.g., a "Service Locator" tool, a "Travel Planner" tool and so on) to guide a user through these various scenarios as well as other scenarios. It is to be understood that these examples are not intended to limit the scope of the present invention.

Example 1

Finding a Service Provider

The user advantageously begins by identifying a location (e.g., a street address, or just a city and state, or a zip code) and the type of service sought (e.g., plumber, landscaping, dog-walking). World server 160 performs a search for matching entity models and displays the results for the user. In one embodiment, results are displayed on a map of the local area, with icons marking the locations of local providers of that service. The icons advantageously reflect the aggregate rating of each provider, e.g., by using color coding or different symbols. Each icon is advantageously implemented as a navigable link to an entity view page.

Based on this information, the user can select one of the icons, thereby navigating to an entity view page for the corresponding entity model (e.g., page 800 of FIG. 8). As described above, the entity view page allows the user to review any information that was included in the entity model by the service provider, to review feedback supplied by other users, and to communicate directly with the service provider. When finished learning about one provider, the user can return to the map view to select another provider, eventually reaching an informed decision as to which provider to use.

Example 2

Planning a Vacation

The user advantageously begins by identifying a destination (e.g., Paris, France). Identifying a destination can be supported by a suitable map-based interface, text-based interface, or other type of interface as desired. Next, the user identifies a category of information in which he is interested (e.g., hotels, attractions, events, getting there), e.g., by selecting from a menu of options. World server 160 performs a search for matching entity models and displays the results. Again, the results may be displayed using icons on a map of the destination area, and the icons can be coded to reflect aggregate ratings of each matching entity model. The icons are navigable links, and user can select any of these icons to learn more about the corresponding entities (e.g., via entity view page 800 of FIG. 8 or other suitable interface). It should be noted that, in addition to business establishments such as hotels or restaurants, the user can also learn about tourist attractions (e.g., the Eiffel Tower) or events (e.g., the Tour de France) that are connected with the selected destination, provided that those entities have corresponding entity models in the world model.

Example 3

Shopping

Figure 9:
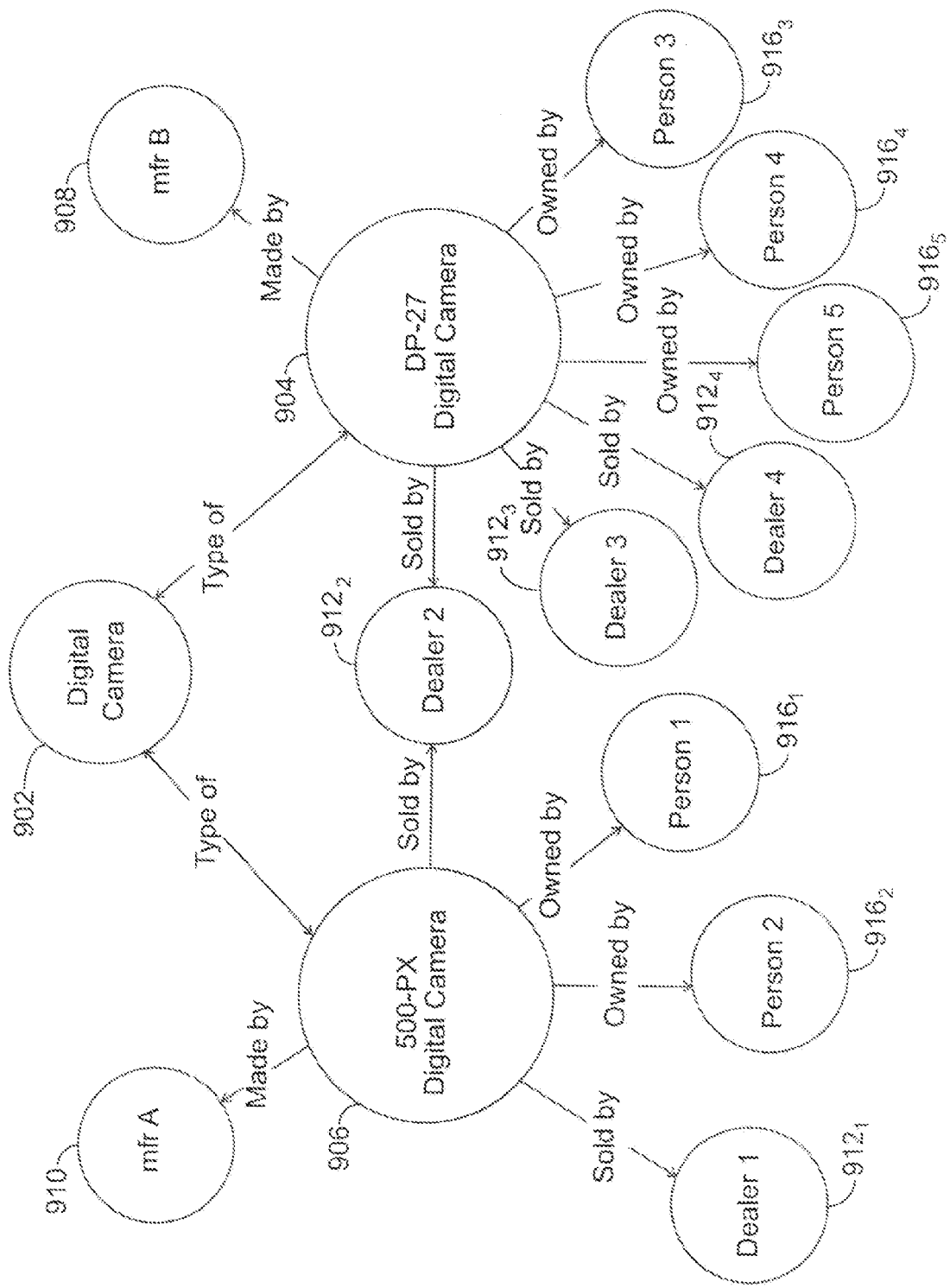
FIG. 9 is a network diagram showing entity models related to digital cameras.

In preferred embodiments, the world model enables a rich collection of related information about material goods, in part by supporting relationships between Thing entity models, including "type of" relationships. By way of example, FIG. 9 is a network graph showing world model entities related to digital cameras according to an embodiment of the present invention. "Digital camera" node 902 is a high-level Thing entity model. "DP-27" node 904 and "500-PX" node 906 are lower-level Thing entity models that represent particular models of digital cameras (the model names used herein are arbitrary and are not intended to represent any actual camera). Nodes 904 and 906 are connected to node 902 by a bidirectional "type of" relationship. Thus, a user interested in digital cameras can find node 902 and navigate to the nodes representing various models.

A high-level Thing entity model may contain little information beyond references to related (e.g., "type of") entities. In some embodiments, a high-level Thing entity model might provide some content, e.g., an explanation of how digital cameras work or definitions for various technical specifications commonly associated with digital cameras. Such content might be provided on a separate Web page, and a link to that Web page can be included in the high-level Thing entity model. The high-level Thing entity model may also include feedback that relates to digital cameras generally (e.g., pros and cons of digital versus film cameras, the importance or unimportance of high pixel counts, etc.).

Content particular to a specific camera model (e.g., a product review) is advantageously linked to the lower-level Thing entity model (e.g., nodes 904, 906) representing that camera. In some embodiments, structured metadata for the lower-level Thing entity model may include fields for technical specifications (e.g., number of pixels, memory medium, zoom capability), price information (e.g., highest or lowest price from the linked-to sellers, or a price range), or the like. In some embodiments, world server 160 may provide the user a listing of camera models, and the user may be able to sort or filter the listings based on any of this metadata. Information about a particular camera, including technical specifications, feature comparisons to other cameras, and product reviews, may also be made available via Web pages, with links to such Web pages being included in the low-level Thing entity models. Like other entity models, "DP-27" node 904 and "500-

PX" node 906 may contain or link to feedback information, such as user ratings and reviews.

Nodes 904 and 906 advantageously provide "made by" relationship links to the respective manufacturers (nodes 908, 910) of the models represented and "sold by" relationship links to various dealers (nodes $912_1$ to $912_4$) that sell each camera model. The user can follow the "made by" link to learn more about the manufacturer or a "sold by" link to learn more about the dealers who sell the camera, e.g., pricing and shipping policies, etc. The user can also review any feedback on the dealers and manufactures that was provided by other users; such feedback may address issues such as whether a certain dealer is reliable, whether a manufacturer's warranty service is good, and so on.

To further enhance the shopping experience, world server 160 may provide tools for assembling and managing shopping-related data across multiple entities. For example, when the user views the "500-PX" entity page, the page may include a table listing the linked-to dealers and their current prices and terms of sale (e.g., shipping charges, taxes), as well as user ratings of the dealers. Such information can facilitate comparison shopping.

In some embodiments, nodes 904 and 906 might also provide "owns" links for Person entity models (nodes $916_1$ to $916_5$) representing people who own that model of camera. The "owned by" links are advantageously created by participants who own the camera in question and are willing to discuss their experiences. A user who is interested in a particular camera model can follow an "owned by" link and communicate directly with someone who already owns that model.

Example 4

Enhancement of Search Results

As noted above, world server 160 may communicate with a search server 170 that is of generally conventional design. In some embodiments, search results generated by search server 170 may be enhanced using information from world server 160. For instance, suppose that a search result includes a URL that is identifiable as belonging to a particular company or product. The search result page may be modified to include a link to the corresponding Business or Thing entity model (assuming one exists in world model data store 162). The link advantageously leads to an entity view page such as page 800 of FIG. 8, enabling the user of search services to become a user of the world model and interact with the entity.

Similarly, search server 170 may provide a yellow pages search service. During execution of a yellow-pages search, the search results page may be enhanced by providing a link to the entity models for any businesses that have corresponding entity models in world model data store 162. Again, this link advantageously leads to an entity view page, allowing the user to interact with the business.

In these embodiments, the user performing the search might not be aware of world server 160; searching of world model data store 162 may be done automatically. Such automatic search enhancement may be used to attract new users to explore and ultimately to become participants in the world model.

Example 5

Learning about People

Various existing Internet-based services allow users to search for other people. For example, online employment services allow job-seekers to post their resumes and employers to search the resumes for candidates matching the employer's hiring criteria. In some embodiments of the present invention, such services can be enhanced by providing links to a Person entity model corresponding to the candidate. An interested employer can interact with the Person entity model to learn information that is not in the candidate's resume. For instance, the Person entity model might link to samples of the candidate's past work or to comments from other users who have worked with the candidate in the past. The Person entity model also provides a convenient communication channel by which the interested employer can contact a candidate directly.

It should be noted that any Internet-based introduction or interest-matching service might be similarly enhanced. For example, a user who posts a personal ad to an Internet dating service might include a link to her Person entity model, allowing interested users of the Service to interact with the Person entity model to learn more about or communicate directly with the poster. As another example, a user who is considering joining an online community (or a user who is already a member) might be able to interact with Person entity models for various members of the community to learn more about them.

In preferred embodiments, each user controls the dissemination of his or her Person entity model(s). For example, a job-seeker would decide whether to link a Person entity model to a resume or profile at all and if so, which of his or her entity models to use. In some embodiments, different components within a Person entity model may have different privacy settings so that the user can selectively make personal information available to some, but not all, fellow users.

Further Embodiments

While the invention has been described with respect to specific embodiments, one skilled in the art will recognize that numerous modifications are possible. For instance, the entity model is not limited to any particular data structure or content, and any content may be stored within the entity model or stored elsewhere and referenced by the entity model. The categories of entities represented may be varied from those described herein, and other communication channels may be used instead of or in addition to specific channels mentioned herein. A world model may be implemented via an Internet-based service or on other networks, and the ability to modify the world model may be restricted or not as desired.

The embodiments described herein may make reference to Web sites, pages, links, and other terminology specific to instances where the World Wide Web (or a subset thereof) serves as a repository of information external to the world model data store or where interfaces to the world model data store rely on tools and protocols developed for the Web (e.g., HTTP and HTML). It should be understood that the systems and processes described herein can be adapted for use with a different information repository (such as an electronic database or document repository) and that entity models are not required to link to or otherwise reference any external information sources. Suitable interfaces for a world model data store may be developed using any available tools and protocols. The particular interfaces described herein are illustrative, and different interfaces may be substituted.

In addition, the invention has been described with reference to computer systems having particular hardware and software elements. It is to be understood that other systems with different combinations of hardware and/or software components could also be implemented.

Thus, although the invention has been described with respect to specific embodiments, it will be appreciated that the invention is intended to cover all modifications and equivalents within the scope of the following claims.

What is claimed is:

1. A computer system for providing information about an entity to a user, the system comprising:
   a world model data store configured to store a plurality of interrelated entity models for a plurality of different categories, each of the entity models being associated with one of the plurality of different categories, the categories including two or more of: a person, a business, a place, tangible things, communities, thoughts and events, the entity models containing information defining relationships between other entity models of the different categories about a corresponding one of a plurality of entities,
   each entity model further having core data that defines each entity being modeled including the name of the entity, a category label, a unique entity identifier and a manager identifier, the entity model further including content section data that includes media content links to audio or video clips relating to the entity, web log content links to web log entries that discuss the entity or are authored by a writer associated with the entity, the entity model further includes a feedback section that stores evaluative information about the entity contributed to the entity model by at least one outside party providing an experience feedback, the entity model further including interrelated entity data to store feedback related to a corresponding entity of the same category;
   each entity model further having an associated communication channel for initiating direct electronic communication with a manager responsible for that one of the plurality of entity models, wherein the direct electronic communication comprises the identifier of the manager together with the information contained in the requested one of the plurality of entity models;
   a world server networked to the world model data store, the world server being configured to receive a user request for an entity model, to return the information contained in the requested entity model including related entity models based on defined relationships to entity models of different categories; and
   a set of instructions executed on a processor, wherein the set of instructions executed on the processor enable the user to access the communication channel associated with the requested entity model and return the manager identifier together with the content section data associated with the requested entity model.

2. The computer system of claim 1 wherein the user request includes a search query specifying a property for the information contained in the entity models and wherein the world server is further configured to identify, as the requested entity model, an entity model for which the contained information matches the property specified in the search query.

3. The computer system of claim 1 wherein the user request includes a request for entity models classified in one of the predefined categories.

4. The computer system of claim 1 wherein the entity models are interrelated by relationships having a plurality of relationship types.

5. The computer system of claim 4 wherein each relationship between two entity models is navigable in at least one direction.

6. The computer system of claim 5 wherein the user request includes a request for entity models that are related to a first entity model by a user-specified relationship type.

7. The computer system of claim 1 wherein the information contained in at least some of the entity models further includes structured metadata describing the corresponding entities, the structured metadata including a plurality of fields and associated values.

8. The computer system of claim 7 wherein the user request includes a request for entity models having a user-specified value for one of the fields of the structured metadata.

9. The computer system of claim 1 wherein the information contained in at least some of the entity models further includes feedback information relating to the corresponding entities, the feedback information being provided by users of the computer system.

10. The computer system of claim 1 wherein the information contained in at least some of the entity models further includes a reference to content related to the corresponding entities.

11. A computer-implemented method for providing information to a user, the method comprising:
   defining in a data store, a plurality of interrelated entity models for a plurality of different categories, each of the entity models being associated with one of the plurality different categories, the categories including two or more of: a person, a business, a place, tangible things, communities, thoughts and events, the entity models containing information defining relationships between other entity models of different categories about a corresponding one of a plurality of entities;
   defining, in the data store, each entity model further having core data that defines each entity being modeled including the name of the entity, a category label, a unique entity identifier and a manager identifier, the entity model further including content section data that includes media content links to audio or video clips relating to the entity, web log content links to web log entries that discuss the entity or are authored by a writer associated with the entity, the entity model further includes a feedback section that stores evaluative information about the entity contributed to the entity model by at least one outside party providing an experience feedback, the entity model further including interrelated entity data to store feedback related to a corresponding entity of the same category;
   associating with each of the plurality of entity models in the data store a communication channel for initiating direct electronic communication with a manager responsible for that one of the plurality of entity models, wherein the direct electronic communication comprises the identifier of the manager together with the information contained in the requested one of the plurality of entity models;
   receiving, at a world server, a user request for an entity model;
   returning, by the world server, the information contained in the requested one of the plurality of entity models including related entity models based on defined relationships to entity models of different categories; and
   executing a set of instructions executed on a processor, wherein executing the set of instructions performs the steps of: automatically enabling the user to access the communication channel associated with the requested entity model and returning the identifier of the manager together with the information contained in the requested one of the plurality of entity models.

12. The method of claim 11 wherein enabling the user to access the communication channel includes:
- providing to the user a form for entry of input to be communicated;
- receiving input from the user via the form; and
- transmitting the received input to the manager via the communication channel.

13. The method of claim 12 wherein the communication channel is selected by the manager.

14. The method of claim 12 wherein the communication channel is selected from a group consisting of an e-mail channel and an instant messaging channel.

15. The method of claim 11 wherein the user request includes a search query specifying a property for the information contained in the entity models, the method further comprising:
- identifying, by the world server, as the requested entity model, an entity model for which the contained information matches the property specified in the search query.

* * * * *